Patented Nov. 17, 1925.

1,561,988

UNITED STATES PATENT OFFICE.

ARTHUR PILLANS LAURIE, OF EDINBURGH, SCOTLAND.

PRESERVATION OF STONE.

No Drawing.   Application filed April 8, 1924.   Serial No. 705,129.

*To all whom it may concern:*

Be it known that I, ARTHUR PILLANS LAURIE, a British subject, and resident of Heriot-Watt College, Chambers Street, Edinburgh, Scotland, have invented certain new and useful Improvements Relating to the Preservation of Stone (for which I have filed an application in England No. 203,042 dated 15th May, 1923), of which the following is a specification.

This invention relates to a method of preserving stone and has for its object the utilization of the properties of silicic esters when exposed to moist air for this purpose.

According to the present invention a silicic ester diluted with a suitable volatile solvent is applied to stone, which is then exposed to the atmosphere so that the volatile solvent is evaporated and the silicic ester hydrolyzed so as to form hydrated silica which cements together the particles of the stone, holding them together and preventing the stone from further decay and at the same time partially waterproofing the stone. It has been found by experience that when the stones of decayed buildings are treated in this manner the particles of the stone will be cemented together and at the same time rendered partially water-proof, thus delaying further decay of the stone.

In carrying the invention into effect industrial alcohol containing about 10% of water is added slowly to silicon tetrachloride in about equal volumes and the hydrochloric acid is subsequently removed by heating the liquid to just below the boiling point of the ester or by passing hot air through the liquid or by any other similar treatment. A liquid is thus obtained which mixes readily with volatile solvents such as alcohol and benzene, and if a material, such as sandstone, is moistened with this solution and then left exposed to the slow action of the moisture in the air, the liquid is slowly hydrolyzed and the particles of sandstone are cemented together by a continuous film of hydrated silica which is thus formed.

In order to preserve stone according to the invention the stone is soaked with a solution obtained as above described. When exposed to the atmosphere the volatile solvent evaporates leaving behind the silicic ester which slowly decomposes forming a film of hydrated silica which cements and waterproofs the stone so that this is no longer liable to be attacked by acids or the action of the atmosphere.

If a sand-stone which consists of indestructible particles of quartz which are bound together by crystals of calcite which is easily attacked by the sulphur acids in the air, is soaked in the silicic ester solution, an additional cement is added which is indestructible and at the same time waterproofs the stone and prevents the entrance of rain and injurious gases and salts, thus preserving the stone.

In the case of a lime-stone, which may be regarded as wholly soluble in acids, when this is soaked with the silicic ester, the particles thereof are cemented together and coated with a protective varnish which resists the action of acids.

It is essential in the present process to dilute the silicic ester with a volatile solvent so as to enable the stone to be penetrated freely by the solution, followed by the evaporation of the volatile solvent and leaving a deposit of silica. If the silicic ester were used alone, successful results would not always be obtained as the ester would be too oily and viscous to penetrate into the stone, but by mixing it with a volatile solvent it is formed into a thin flowing liquid which easily penetrates into the pores of the stone, completely filling the pores so that when the volatile solvent evaporates a deposit of silica will be left in the pores which binds the material of the stone together. In actual practice it has been found that where stone has decayed to such an extent that it is crumbling into powder, the stone can be preserved by treatment with the solution of silicic ester as above described and that the deposited silica will hold together the particles of the stone.

Having thus described my invention what I claim as new and desire to secure by Letters Patent is:—

1. A method of preserving stone consisting in soaking the stone with an undecomposed silicic ester dissolved in a volatile solvent therefor, and allowing the moisture of the air to hydrolyze the solution, whereby a continuous film of hydrated silica is formed in the stone and holds the same together.

2. A method of preserving stone consisting in mixing a silicic ester with a volatile solvent for the silicic ester, soaking the stone with the solution thus obtained whereby the solution will penetrate into the pores of the stone, and exposing the stone thus treated to the moisture of the air so that the volatile solvent is slowly evaporated and hydrated silica is deposited in the pores of the stone so as to form a continuous film which binds together the remaining portions of the stone.

ARTHUR PILLANS LAURIE.